United States Patent
La Fleur et al.

(10) Patent No.: US 9,458,347 B2
(45) Date of Patent: *Oct. 4, 2016

(54) AQUEOUS COATING COMPOSITION AND COATING FORMED THEREFROM HAVING A PARTICULAR GLOSS PROFILE

(71) Applicant: Rohm and Haas Company, Philadelphia, PA (US)

(72) Inventors: Edward La Fleur, Holland, PA (US); Partha S. Majumdar, Harleysville, PA (US); Edwin Hugh Nungesser, Horsham, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/419,802

(22) PCT Filed: Sep. 18, 2013

(86) PCT No.: PCT/US2013/060261
§ 371 (c)(1),
(2) Date: Feb. 5, 2015

(87) PCT Pub. No.: WO2014/047089
PCT Pub. Date: Mar. 27, 2014

(65) Prior Publication Data
US 2015/0184016 A1    Jul. 2, 2015

Related U.S. Application Data

(60) Provisional application No. 61/702,421, filed on Sep. 18, 2012.

(51) Int. Cl.
*C09D 133/08* (2006.01)
*C08F 265/06* (2006.01)
*C08F 285/00* (2006.01)
*C09D 151/00* (2006.01)

(52) U.S. Cl.
CPC ......... *C09D 133/08* (2013.01); *C08F 265/06* (2013.01); *C08F 285/00* (2013.01); *C09D 151/003* (2013.01); *C08L 2205/025* (2013.01)

(58) Field of Classification Search
CPC .......... C09D 133/08; C09D 151/003
USPC ................. 523/201, 221
See application file for complete search history.

(56) References Cited

U.S. PATENT DOCUMENTS

| | | | |
|---|---|---|---|
| 5,264,482 A | 11/1993 | Taylor et al. | |
| 5,506,282 A | 4/1996 | Min et al. | |
| 5,610,215 A | 3/1997 | Nonweiler et al. | |
| 5,700,522 A | 12/1997 | Nonweiler et al. | |
| 7,768,692 B2 | 8/2010 | Takemoto et al. | |
| 7,829,626 B2 | 11/2010 | Chiou et al. | |
| 7,893,162 B2 | 2/2011 | Lafleur et al. | |
| 8,563,130 B2 | 10/2013 | Chung et al. | |
| 8,900,669 B2 * | 12/2014 | LaFleur .............. | C09D 5/022 427/387 |
| 2013/0052357 A1 | 2/2013 | Lafleur et al. | |
| 2013/0052454 A1 | 2/2013 | Donovan et al. | |
| 2013/0053499 A1 | 2/2013 | Donovan et al. | |
| 2013/0247985 A1 | 9/2013 | Tysak et al. | |

FOREIGN PATENT DOCUMENTS

| | | | |
|---|---|---|---|
| CN | 102073073 A | | 5/2011 |
| EP | 2431424 A2 | | 3/2012 |
| EP | 2586836 A1 | | 5/2013 |
| TW | 203087 B | | 4/1993 |
| TW | 294709 B | | 1/1997 |
| WO | 2014/047089 A1 | | 3/2014 |

OTHER PUBLICATIONS

PCT/US2013/060261, International Search Report & Written Opinion Mailed Nov. 21, 2013.
PCT/ US2013/060261, International Preliminary Report on Patentability. Mailed Apr. 2, 2015.

* cited by examiner

*Primary Examiner* — Edward Cain

(57) ABSTRACT

An aqueous coating composition including: certain first solid polymeric particles having an average diameter of 0.60-0.99 μm and certain second solid polymeric particles having a calculated Tg of from −60° C. to 120° C. and an average particle diameter of from 50 nm to 500 nm; wherein the dry weight ratio of the first solid polymeric particles to the second solid polymeric particles is from 0.15:1 to 10:1; and the aqueous coating composition includes less than 10% by volume, inorganic extender particles is provided. Also provided is a coating having a ratio of 85° specular gloss to 20° specular gloss equal to or greater than 33 formed from the aqueous coating composition.

9 Claims, No Drawings

AQUEOUS COATING COMPOSITION AND COATING FORMED THEREFROM HAVING A PARTICULAR GLOSS PROFILE

This invention relates to an aqueous coating composition, a method for providing a coating therefrom, and a clear or pigmented polymeric coating having a particular gloss profile. In particular, this invention relates to an aqueous coating composition including: first solid polymeric particles selected from the group consisting of: multi-stage graded refractive index (grin) composition copolymer particles having an average diameter of 0.60-0.99 µm; multi-stage copolymer particles having an average diameter of 0.60-0.99 µm and a rubbery core, the core having a calculated glass transition temperature ($T_g$) of 20° C. or less; and mixtures thereof; and, second solid polymeric particles having a calculated Tg of from −60° C. to 120° C. and an average particle diameter of from 50 nm to 500 nm; wherein the dry weight ratio of the first solid polymeric particles to the second solid polymeric particles is from 0.15:1 to 10:1; and the aqueous coating composition comprises less than 10% by volume, inorganic extender particles.

This invention pertains to an aqueous polymeric coating composition that is useful for forming protective, decorative, graphic arts or specialty coatings. This invention is specifically useful for coatings that require a low specular gloss at low angles and a very high specular gloss at high angles. Typically, coatings are formulated to deliver either an overall high specular gloss or an overall low specular gloss when applied to a substrate, that is, the gloss is either relatively low at all specular angles or relatively high at all specular angles. For instance a gloss coating has both a high gloss at 20° and 85° specular angles, while a flat coating has both a low gloss at 20° and 85° specular angles. In certain cases coatings having intermediate glosses such as, for example, "eggshell" or "satin" gloss coatings, as they are known in the art, provide gloss intermediate between gloss and flat coatings, but they do not meet the gloss profile provided by the present invention.

U.S. Pat. No. 7,829,626 discloses matte coatings for leather including a binder component and certain copolymer duller particles having an average diameter of 1-20 microns.

The problem we have solved with this invention is the ability to achieve a coating that demonstrates the combination of very low specular gloss at low angles such as, for example, 20° concurrently with very high specular gloss at high angles such as, for example, 85°. This gloss profile, i.e., the ratio of the specular gloss at an angle of 85° to the specular gloss at an angle of 20°, has significant application, for example, in coatings that can be used to create the dual visual effects of low specular gloss and high specular gloss in the same coating. In this case a person looking at the wall painted with a pigmented coating composition of this invention in a normal direction (low angle) would say the wall paint is matte but if the same person looked at the same wall painted with the same composition of this invention from a different angle this person would say this wall paint is glossy. The problem was solved by the selection of coating compositions including select particle sizes in the absence of substantial levels of inorganic extender particles that introduce undesirable side effects such as, for example, a rough feeling to the touch and hazy reflected images.

In a first aspect of the present invention there is provided an aqueous coating composition comprising: first solid polymeric particles selected from the group consisting of: multi-stage graded refractive index (grin) composition copolymer particles having an average diameter of 0.60-0.99 µm; multi-stage copolymer particles having an average diameter of 0.60-0.99 µm and a rubbery core, said core having a calculated glass transition temperature ($T_g$) of 20° C. or less; and mixtures thereof; and, second solid polymeric particles having a calculated Tg of from −60° C. to 100° C. and an average particle diameter of from 50 nm to 500 nm; wherein the dry weight ratio of said first solid polymeric particles to said second solid polymeric particles is from 0.15:1 to 10:1; and said aqueous coating composition comprises less than 10% by volume, inorganic extender particles.

In a second aspect of the present invention there is provided a method for providing a coating comprising: (a) forming said aqueous coating composition of the first aspect of the present invention; (b) applying said coating composition to a substrate; and, (c) drying, or allowing to dry, said coating composition.

In a third aspect of the present invention there is provided a coating formed by the method of the second aspect of the present invention wherein the ratio of the 85° specular gloss to the 20° specular gloss is equal to or greater than 33.

The aqueous coating composition of the present invention includes first solid polymeric particles and second solid polymeric particles. By "solid polymeric particles" herein is meant that the polymeric particles, when dry, do not include one or more voids.

The aqueous coating composition of the present invention includes first solid polymeric particles selected from the group consisting of: multi-stage graded refractive index (grin) composition copolymer particles having an average diameter of 0.60-0.99 µm; multi-stage copolymer particles having an average diameter of 0.60-0.99 µm and a rubbery core, the core having a calculated glass transition temperature ($T_g$) of 20° C. or less; and mixtures thereof. By "aqueous" herein is meant that the continuous phase of the composition is predominantly water, preferably more than 70% by weight water; optional other components of the continuous phase are water-soluble solvents, oligomers, polymers, and the like.

The first solid polymeric particles have an average diameter of 0.60-0.99 µm, preferably of 0.80-0.90 µm. Particles of this size domain are important for creating excellent surface smoothness that will lead to a very high specular gloss at high angles (85°). In this aspect particle size uniformity and particle aspect ratio are important. First solid polymeric particles having an average diameter of greater than 0.99 µm will tend to protrude further outside of the surface of the coating hence reducing the specular gloss at a high angle. While at a low angle (20°) the diffusion of light is enhanced by multiple stage particles and preferably particles that possess a gradient refractive index throughout the particles. First solid polymeric particles having an average diameter of less than 0.60 µm will tend to produce high gloss coatings rather than those providing the desired gloss profile.

Preferably, the first solid polymeric particles are multi-stage polymers with, for example, a core-shell or other multi-stage morphology, such as a multilobal structure. Multi-stage first solid polymeric particles include a polymeric core phase and one or more polymeric shell phases and can be a graded refractive index (grin) composition. The core may be prepared from a variety of vinyl monomers, and may be a rubbery or glassy polymer. The core may be prepared from polymerization or copolymerization of such monomers as diolefins, e.g. butadiene or isoprene; vinyl aromatic monomers, e.g. styrene or chlorostyrene; vinyl esters, e.g. vinyl acetate or vinyl benzoate; acrylonitrile; methacrylonitrile; (meth)acrylate esters, e.g. methyl methacrylate, butyl methacrylate, phenyl methacrylate, ethyl acrylate, butyl acrylate, 2-ethylhexyl acrylate, and benzyl acrylate; vinyl chloride; and other monomer polymerizable by free-radical initiation. Preferably, the first solid polymeric particles as described by their predominant components are acrylic multi-stage copolymer particles, vinyl multi-stage copolymer particles, multi-stage olefin polymer particles, multi-stage polysiloxane particles, multi-stage synthetic rubber copolymer particles, multi-stage urethane copolymer particles, water-dispersible graft copolymer particles, mixtures thereof, combinations thereof, and mixtures thereof with a single stage crosslinked (co)polymer. Particularly preferred are acrylic multi-stage copolymer particles due to their heat, moisture and UV stability at an attractive cost.

In one embodiment, the first solid polymeric particles are multi-stage polymers having rubbery cores, i.e. core polymers having a calculated Tg of 20° C. or less, or, alternatively, 10° C. or less. Rubbery cores may include synthetic or natural rubbers, or, preferably, acrylic rubbers. Acrylic rubber cores include alkyl acrylate copolymers, the alkyl group having from 2 to 8 carbon atoms, copolymerized with from 0 to 15 wt. %, preferably from 0 to 10 wt. %, of one or more crosslinkers, based on the total weight of core monomers, from 0 to 15 wt. %, preferably from 0 to 10%, of one or more graftlinker, based on the total weight of core monomers, and from 0 to 50 wt. % of one or more copolymerizable ethylenically unsaturated monomer, based on the total weight of core monomers. Of the one or more polymer shells surrounding the acrylic rubber, the outermost shell is compatible with the second solid polymeric particles. The shell(s) may comprise from 0 to 40 wt. % of the multistage particles.

In rubbery core polymers for the first solid polymeric particles, the preferred alkyl acrylate is t-BA or n-BA. The copolymerizable ethylenically unsaturated monomer or monomers may be mono ethylenically unsaturated monomers, such as alkyl methacrylates and mono ethylenically unsaturated arenes, e.g. styrene. Ethylenically unsaturated arenes, as used herein, include such monoethylenically unsaturated aromatic monomers as styrene, alkylstyrenes such as methylstyrene and ethylstyrene, other substituted vinylbenzenes wherein the substitutents do not interfere with polymerization, and similar vinyl polycyclic aromatic monomers. The refractive index of the core polymer and of the second polymeric particle may, optionally, match exactly to produce an almost completely transparent composition.

Crosslinking monomers suitable for use in the core polymer are generally di- or poly-ethylenically unsaturated monomers copolymerizable with the other core monomers, wherein the ethylenically unsaturated groups have approximately equal reactivity, such as, for example, divinylbenzene (DVB); glycol di- and tri-(meth)acrylates, such as, for example, 1,4-butylene glycol dimethacrylate, 1,2-ethylene glycol dimethacrylate, and 1,6-hexanediol diacrylate; triol tri(meth)crylates, diallyl phthalate, and the like. The preferred crosslinking monomers are butylene glycol diacrylates.

Graftlinking monomers suitable for use in the core polymer generally are di- or poly-ethylenically unsaturated monomers copolymerizable with the other core monomers and having sufficiently low reactivity of one of the unsaturated groups to allow significant residual unsaturation to remain in the core polymer, such as, for example, allyl methacrylate (ALMA), allyl acrylate, diallyl maleate, allyl acryloxypropionate and the like. The preferred graftlinking monomer is ALMA.

Surrounding the core of a multi-stage polymer particle is one or more shells of polymer. The shell polymers may represent from about 0.1 to about 40%, preferably, from about 5 to about 40%, and, more preferably, from about 15 to about 35%, based on the total particle weight.

The outer shell polymer of multi-stage first solid polymeric particles is preferably thermodynamically compatible with the polymer at the surface of the second solid polymeric particles. For example, a shell of poly(methyl methacrylate) will be thermodynamically compatible with a second polymer of poly(methyl methacrylate) or poly(vinyl chloride). Other such compatible polymer combinations for the first and second solid polymeric particles are known to those skilled in the art, and others may readily be determined by routine experimentation, as for example by preparing blends of proposed first and second solid polymeric particles and examining the blends for such evidence of compatibility as absence of haze, existence of a single glass transition temperature, and the like.

The first solid polymeric particles may be made by any process that can provide particles having an average particle diameter of 0.60-0.99 µm. The first solid polymeric particles may be formed by methods known in the art such as, for example, emulsion polymerization, seeded growth processes, and suspension polymerization processes. Such polymers are described, for example, in U.S. Pat. Nos. 4,403,003; 7,768,602; and 7,829,626, and are also exemplified herein. The polymer may be may be made in a multiple step process such as a core/shell process that may result in a multiphase particle or in a particle in which the phases co-mingle for a gradient of composition throughout the particle, or in a gradient process in which the composition is varied during one or more stages.

Preferably, the first solid polymeric particles are formed by emulsion polymerization. In a preferred embodiment of the present invention, first solid polymeric particles are prepared by aqueous emulsion polymerization of at least one monomer component of either the core or single stage (co)polymer to form emulsion (co)polymer or oligomer seed particles, followed by swelling the seed particles with one or more monomer components of the core, e.g. via absorption, and polymerizing the one or more monomers within the emulsion seed particles to yield the particles of a desired average diameter and, preferably, having a narrow particle size distribution. The swelling and polymerizing steps may be repeated until the particles have grown to the desired core or single stage (co)polymer size. Where seed particles are pre-made, particles of varying size and composition suitable for use as first solid polymeric particles can be produced by using appropriately sized swellable (co)polymer or oligomer seeds. Seed particles may be made by conventional emulsion (co)polymerization. Suitable seed polymer precursors for making first solid polymeric particles may include, for example, oligomeric emulsion polymer particles in the range 30-500 nm One or more or all swelling and polymerization steps may be performed in the absence of conditions limiting the molecular weight of the resulting (co)polymer, such as, for example, in the absence of a chain-transfer agent. However, initially formed emulsion (co)polymer seed particles do not swell as readily as subsequent, larger particles having a lower overall molecular weight formed under conditions limiting the molecular weight of the resulting (co)polymer. At least the final (co)polymerization stage is typically carried out under conditions which do not limit the polymer molecular weight.

More preferably, the core (co)polymers may be made by emulsion polymerizing the monomers using conditions which restrict the molecular weight of the (co)polymer that forms, such as, for example, by including chain-transfer agents, e.g., mercaptans, in the polymerization mixture to form a more easily swellable emulsion oligomer or (co) polymer. Accordingly, one or more or all of the swelling and polymerization steps can be performed using the conditions which restrict the polymer molecular weight and such steps can be alternated, followed by or subsequent to swelling and polymerization steps may be performed in the absence of conditions limiting the molecular weight of the resulting (co)polymer. More preferably, the core or single stage (co)polymers may be made by emulsion polymerizing the monomers using conditions which restrict the molecular weight of the (co)polymer that forms, such as, for example, by including chain-transfer agents, e.g., mercaptans, in the polymerization mixture to form a more easily swellable emulsion oligomer or (co)polymer. Accordingly, one or more or all of the swelling and polymerization steps can be performed using the conditions which restrict the polymer molecular weight and such steps can be alternated, followed by or subsequent to swelling and polymerization steps may be performed in the absence of conditions limiting the molecular weight of the resulting (co)polymer.

Alternatively, dry polymer particles can be processed to a desired size and then dispersed in water if they are water dispersible, i.e. include hydrophilic groups such as hydroxyl, carboxyl or amine groups, or, alternatively, emulsified to form an oil-in-water emulsion. For example, dry particles having a Tg above room temperature or 25° C. may be ground, such as by jet milling, and, if needed, run through a particle classifier to create the desired average diameter and, if desired, a narrow particle size distribution. Dry rubbery or thermoplastic particles may be cryoground and run through a classifier to create the desired average diameter.

Other alternative techniques to manufacture emulsion (co)polymers or (co)polymer cores are disclosed in the literature, such as, for example, Japanese Kokai Publication 62-84156 which describes a growout process involving polymerization of mixtures of monofunctional and polyfunctional monomers, followed by a staging with a high concentration of polyfunctional monomers, with oil-soluble initiators onto a pre-formed seed to form fine granules.

Crosslinking of any (co)polymer and any graftlinking of a core (co)polymer to a shell polymer results from inclusion of one or more copolymerizable crosslinking and/or graftlinking monomers in the polymerizable monomer mixtures. Alternatively, the core polymer may be crosslinked and the core polymer may be graftlinked to the shell polymer using other known techniques, for example, post-cure reactions, such as by forming a copolymer from a monomer having a pendant peroxide group and then activating the peroxide by heating to a temperature higher than that used in the polymerization. The activated peroxide group will promote graftlinking and crosslinking of the core/shell polymer components. In another example, crosslinking or graftlinking may be achieved post-cure by adding to the polymerization a second free-radical initiator that is stable at the initial polymerization temperature and is activated by light or at a higher temperature, followed by activating the initiator.

It is preferred that gradient multi-stage first solid polymeric particles possess resistance to deformation and low thermoplasticity in order to retain their dimensions in conditions of high heat or of high pressure. Loss of dimension may result in higher specular gloss at low angle and diminished appearance provided by the desired gloss profile. To provide for enhanced dimensional stability of the particle it is preferred that the multiple stage particles comprise 0.1-20% of a copolymerized multivalent crosslinking monomer, preferably 2-10%, more preferably 4-10% by weight based on the weight of the multiple stage particles. Particles with insufficient dimensional stability will tend to deform or flatten out when exposed to heat or pressure and as a result the coating surface gloss will increase at all specular angles.

Multi-stage first or second solid polymeric particles can be multilobal polymeric particles. In the case of the second solid polymeric particles, the outer polymer or lobes should be film forming. Multilobals are formed from different and relatively incompatible core and lobe (co)polymer compositions, varying to the extent that the interaction parameter, $X_{C-L}$, is greater than about 0.05. The interaction parameter can be calculated for the lobe and core polymers by the method of Krause et al., J. Chem. Physics, 43, 2144 (1965). Appropriate values of the Hildebrand solubility values necessary for the calculation may be found in Van Krevelen, "Properties of Polymers," Elsevier Publishers (New York), 1976. Multilobals may be formed by adding an initial increment of a redox couple or of a reducing agent alone and starting gradual addition feed of the appropriate lobe-forming monomer and gradual addition of the redox couple simultaneously with the monomer feed as polymerization proceeds at the same or a higher rate of addition to completion, wherein an increased the level of one or more surfactant is added with lobe-forming monomer to just below the level at which new particles are initiated. The average diameter of the multilobal particles herein is taken as the diameter a sphere of equivalent volume.

It is preferable that the first solid polymeric particles in the aqueous coating composition be stabilized so as to minimize separation or sedimentation. This may be accomplished by the use of thickening or viscosity-building materials such as, for example, alkali-soluble emulsion polymers, hydrophobically modified alkali soluble polymers, hydrophobically enhanced urethane resins, and clay-based compositions incorporated in the aqueous coating composition.

The aqueous coating composition of the present invention includes second solid polymeric particles having a calculated Tg of from –60° C. to 120° C. and an average particle diameter of from 50 nm to 500 nm.

The polymer of the second solid polymeric particles typically includes at least one nonionic copolymerized ethylenically unsaturated monomer such as, for example, a (meth)acrylic ester monomer including methyl (meth)acrylate, ethyl (meth)acrylate, butyl (meth)acrylate, 2-ethylhexyl (meth)acrylate, decyl (meth)acrylate, hydroxyethyl (meth)acrylate, hydroxypropyl (meth)acrylate, ureido-functional (meth)acrylates and acetoacetates, acetamides or cyanoacetates of (meth)acrylic acid; styrene or substituted styrenes; ethylene; vinyl toluene; butadiene; monoethylenically unsaturated acetophenone or benzophenone derivatives such as, for example are taught in U.S. Pat. No. 5,162,415; vinyl acetate or other vinyl esters; vinyl monomers such as vinyl chloride, vinylidene chloride, vinylidene fluoride, and N-vinyl pyrollidone; (meth)acrylonitrile; N-alkylol (meth)acrylamide. The use of the term "(meth)" followed by another term such as (meth)acrylate or (meth)acrylamide, as used throughout the disclosure, refers to both acrylates or acrylamides and methacrylates and methacrylamides, respectively. The second polymer may also be a urethane polymer. The second polymer is substantially uncrosslinked, that is, the first polymer includes less than 1 weight %, preferably less than 0.2 weight %, based on the weight of the polymer, and more preferably 0% of a copolymerized multi-ethylenically unsaturated monomer. Multi-ethylenically unsaturated monomers include, for example, allyl (meth)acrylate, diallyl phthalate, 1,4-butylene glycol di(meth)acrylate, 1,2-ethylene glycol di(meth)acrylate, 1,6-hexanediol di(meth)acrylate, and divinyl benzene.

The second polymer typically has an acid number of from 5 to 100, calculated by determining the number of milliequivalents of acid per gram in the first polymer and multiplying by the molecular weight of potassium hydroxide. Acid monomers include carboxylic acid monomers such as, for example, acrylic acid, methacrylic acid, crotonic acid, itaconic acid, fumaric acid, maleic acid, monomethyl itaconate, monomethyl fumarate, monobutyl fumarate, and maleic anhydride; and sulfur- and phosphorous-containing acid monomers. Preferred acid monomers are carboxylic acid monomers. More preferred monomers are (meth)acrylic acid.

The calculated glass transition temperature ("Tg") of the second polymer is from −60° C. to 100° C. "Calculated Tgs" of the polymers herein are those calculated by using the Fox equation (T. G. Fox, Bull. Am. Physics Soc., Volume 1, Issue No. 3, page 123 (1956)). that is, for calculating the Tg of a copolymer of monomers M1 and M2, $$1/Tg(calc.) = w(M1)/Tg(M1) + w(M2)/Tg(M2),$$

wherein
Tg(calc.) is the glass transition temperature calculated for the copolymer
w(M1) is the weight fraction of monomer M1 in the copolymer
w(M2) is the weight fraction of monomer M2 in the copolymer
Tg(M1) is the glass transition temperature of the homopolymer of M1
Tg(M2) is the glass transition temperature of the homopolymer of M2,
all temperatures being in ° K.

The glass transition temperature of homopolymers may be found, for example, in "Polymer Handbook", edited by J. Brandrup and E. H. Immergut, Interscience Publishers. In calculating Tgs herein the contribution of copolymerized graftlinking monomers is excluded. For multi-staged second solid polymeric particles the calculated Tg herein is that calculated from the total overall composition of the particle.

The polymerization techniques used to prepare such second polymeric particles, typically by emulsion polymerization, are well known in the art such as, for example, as disclosed in U.S. Pat. Nos. 4,325,856; 4,654,397; and 4,814,373. Conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Redox processes are preferred. The monomer mixture for a stage may be added neat or as an emulsion in water. The monomer mixture for a stage may be added in a single addition or more additions or continuously over the reaction period allotted for that stage using a uniform or varying composition; preferred is the addition of the first and/or second polymer monomer emulsion as a single addition. Additional ingredients such as, for example, free radical initiators, oxidants, reducing agents, chain transfer agents, neutralizers, surfactants, and dispersants may be added prior to, during, or subsequent to any of the stages.

A multi-stage emulsion polymerization process usually results in the formation of at least two mutually incompatible polymer compositions, thereby resulting in the formation of at least two phases. The mutual incompatibility of two polymer compositions and the resultant multiphase structure of the polymer particles may be determined in various ways known in the art. The use of scanning electron microscopy using staining techniques to emphasize the difference between the phases, for example, is such a technique. The multistage emulsion polymer may be referred to as a core/shell polymer. The polymeric particles include two or more phases of various geometries such as, for example, core/shell or core/sheath particles, core/shell particles with shell phases incompletely encapsulating the core, and core/shell particles with a multiplicity of cores.

The average particle diameter of the second solid polymeric particles is from 50 to 500 nanometers. Processes yielding polymodal particle size distributions such as those disclosed in U.S. Pat. Nos. 4,384,056 and 4,539,361, for example, may be employed.

In the aqueous coating composition of the present invention the dry weight ratio of said first solid polymeric particles to said second solid polymeric particles is from 0.15:1 to 10:1; the aqueous coating composition includes less than 10%, preferably less than 5%, more preferably less than 2%, and most preferably 0%, by volume, inorganic extender particles. The inorganic extender particles herein have a refractive index of less than 1.8 and typically greater than or equal to 1.3. Inorganic extender particles include calcium carbonate, calcium sulfate, barium sulfate, mica, clay, calcined clay, feldspar, nepheline, syenite, wollastonite, diatomaceous earth, alumina silicates, non-film forming polymer particles, aluminum oxide, silica, and talc.

The aqueous coating composition is prepared by techniques which are well known in the coatings art. The first and second solid polymeric particles are added under low shear stirring along with other coatings adjuvants as desired. The aqueous coating composition may contain, in addition to the first and second solid polymeric particles, film-forming or non-film-forming solution or emulsion polymers not within the parameters of the first or second solid polymeric particles, in an amount of 0% to 100% by weight of the sum of the first and second polymeric particles, pigments, and conventional coatings adjuvants such as, for example, emulsifiers, coalescing agents, antifreezes, curing agents, buffers, neutralizers, thickeners, rheology modifiers, humectants, wetting agents, plasticizers, antifoaming agents, UV absorbers, fluorescent brighteners, light or heat stabilizers, biocides, chelating agents, dispersants, colorants, colorant dispersions, waxes, water-repellants, pigments, extenders, and anti-oxidants.

As is generally the case in aqueous compositions including multiple ingredients and, particularly, multiple particulate species, it is beneficial to select materials for inclusion in the aqueous coating composition that interact favorably reducing the possibility of decreasing the colloidal stability of the individual components, changing the solubility of the components, or precipitating any of the components in the aqueous coating or during any drying process. In one aspect, undesirable mixtures could cause the generation of gel or grit which would interfere with attaining the desired gloss profile of the dry coating as it would reduce the smoothness of the coating and reduce the high angle specular gloss. In another aspect undesirable mixtures can cause coating separation or gelling prior to being able to apply the aqueous coating composition on a substrate and can create a dry coating with defects that lead to poor physical performance. It is well known by those skilled in the art that the incorrect selection of components of a coating mixture such as, for example, dispersants, thickeners, biocides, and solvents can create potential problems. A further consideration is the colloidal compatibility of the first and the second solid polymeric particles. Many times the first and the second solid polymeric particles are provided as aqueous dispersions of colloidally stabilized particles. It is important that the second solid polymeric particles do not exhibit colloidal incompatibility with the first solid polymeric particles. This may be accomplished by combining particles of the same charge (i.e all particles contain either a negative charge or a positive charge) but also may be accomplished by combining one particle of one charge with another particle essentially without a charge or slightly different charge. Blending particles of substantially different charges creates a colloidal incompatibility which can lead to particle aggregation (or particle grit) or complete gelling of the coating composition. A colloidally compatible mixture in this sense will result in a non-gelled coating composition or a coating free of grit.

In certain embodiments a photosensitive compound such as, for example, benzophenone or a substituted acetophenone or benzophenone derivative as is taught in U.S. Pat. No. 5,162,415 may be added. In certain embodiments the aqueous coating composition of the invention has a VOC (volatile organic compound) level of less than 150 g/liter of coating, alternatively of less than 100 g/lter, or further alternatively of from 0 g/liter to 50 g/liter.

The solids content of the aqueous coating composition may be from 10% to 70% by volume. The viscosity of the aqueous coating composition may be from 50 centipoises to 50,000 centipoises, as measured using a Brookfield viscometer; viscosities appropriate for different application methods vary considerably.

In the method for providing a coating of the present invention the aqueous coating composition is applied to a substrate and, dried, or allowed to dry. The aqueous coating composition is typically applied to a substrate such as, for example, wood, metal, polymeric compositions such as polyester, polyolefin, polyvinyl chloride, and the like, leather, paper, cardboard, woven or nonwoven textiles, cementitious substrates such as, for example, concrete, stucco, drywall, and mortar, previously printed, painted or primed surfaces, and weathered surfaces. The aqueous coating composition may be applied to a substrate using conventional coatings application methods such as, for example, paint brush, paint roller, gravure roll, curtain coater and spraying methods such as, for example, air-atomized spray, air-assisted spray, airless spray, high volume low pressure spray, and air-assisted airless spray.

Drying of the aqueous coating composition may proceed under ambient conditions such as, for example, at 5° C. to 35° C. or the coating may be dried at elevated temperatures such as, for example, from 35° C. to 150° C.

Without being bound by a specific theory, it is believed that the coating is formed from the aqueous polymeric coating in such a manner that predominantly the second solid polymeric particles fuse to form a continuous film while the first solid polymeric particles retain their particulate nature. Consequently, the film formation of the second emulsion polymer may benefit from coalescing agents, heat, and the like, but desirably not to a level or extent that would jeopardize the retention of the particulate identity and dimensions of the first solid polymeric particles.

The coating of the present invention coating, when pigmented, is preferably below its critical pigment volume concentration. The coating exhibits the desired gloss profile, i.e., the ratio of the 85° specular gloss to the 20° specular gloss is equal to or greater than 33, preferably equal to or greater than 40, and more preferably equal to or greater than 50. To achieve this gloss profile it is required that the first solid polymeric particles be of an average diameter that is from 0.60 µm to 0.99 µm and it is desirable that the first solid polymeric particles maintain their dimensions during the process of film formation. It is preferred that the film thickness of the coating is a minimum of 5 nm greater than the first polymeric particle average diameter.

The following examples serve to illustrate the invention.

ABBREVIATIONS

Ethyl acrylate EA n-Butyl acrylate BA

Acrylic acid AA

Methacrylic acid MAA

Allyl methacrylate ALMA

DI water=deionized water

Measurement of Particle Size.

Particle diameters of from 40 nm to 500 nm herein are those measured with a Brookhaven Instruments particle size analyzer BI-90 PLUS (Brookhaven Instruments Company, 750 Blue Point Road, Holtsville, N.Y. 11742).

Particle diameters of from 0.60 microns to 0.99 microns herein are those measured using a Coulter Corporation Multisizer IIE particle size analyzer.

Particle diameters of greater than 1 micron herein are those measured using a Disc Centrifuge Photosedimentometer ("DCP") (CPS Instruments, Inc.) that separates modes by centrifugation and sedimentation through a sucrose gradient. The samples were prepared by adding 1-2 drops into 10 cc DI water containing 0.1% sodium lauryl sulfate. 0.1 cc of the sample was injected into the spinning disc filled with 15 cc. sucrose gradient. Samples were analyzed relative to a polystyrene calibration standard. Specific conditions were: sucrose gradient 2-8%; disc speed 10,000 rpm; the calibration standard was 895 nm diameter polystyrene.

Measurement of Specular Gloss:

Drawdowns of the coatings were prepared at 25° C. and 50% relative humidity (RH) using a bird applicator over white Leneta chart. The coatings were dried for 24 hrs at 25° C. and 50% RH before performing gloss measurements. ASTM D-523 method was followed to measure gloss values using a BYK micro-TRI-gloss µ gloss meter. Gloss values for each sample were reported at three angles, 20°, 60°, and 85°.

Sample A. Formation of Second Solid Polymeric Particles

Synthesis of Sample A, an 80 nm 2-stage emulsion polymer with composition: 80(96.5EA/3.5AA)//20MMA: Calculated Tg of stage 1 is −19.04° C.;

calculated Tg of Stage 2 is 105° C.

TABLE A.1

Mixtures used in the formation of Sample A

| Mixture | Component | Parts by Weight |
|---|---|---|
| A | Water | 238.58 |
| | 28% aq. sodium lauryl sulfate | 28.99 |
| | 30% aq. secondary alcohol ethoxylate (15.4 HLB) | 108.21 |
| | EA | 783.18 |
| | AA | 28.41 |
| B | 0.15% ferrous sulfate heptahydrate | 4.08 |
| C | Water | 25.49 |
| | Ammonium persulfate | 0.81 |
| D | Water | 25.49 |
| | Sodium hydrosulfite | 1.43 |
| | Ammonium hydroxide | 0.41 |
| E | Water | 20 |
| | t-Butyl hydroperoxide | 0.46 |
| F | Water | 20 |
| | Disodium salts of 2-hydroxy-2-sufinatoacetic acid and 2-hydroxy-sufonatoacetic acid, sodium sulfite. | 0.47 |
| G | MMA | 202.90 |
| H | Water | 9.18 |
| | t-Butyl hydroperoxide | 0.92 |
| I | Water | 38.74 |
| | Disodium salts of 2-hydroxy-2-sufinatoacetic acid and 2-hydroxy-sufonatoacetic acid, sodium sulfite. | 0.9 |
| J | Water | 35.69 |
| | t-Butyl hydroperoxide | 1.53 |
| K | Water | 35.69 |
| | Disodium salts of 2-hydroxy-2-sufinatoacetic acid and 2-hydroxy-sufonatoacetic acid, sodium sulfite. | 1.33 |
| L | Triethylamine | 17.84 |
| | Water | 50.98 |

A reactor equipped with a stirrer and condenser was charged with 1035 g DI water. Nitrogen was allowed to bubble through the water for 30 minutes. The reactor was then blanketed with nitrogen and charged with Mixture A. With the reactor mixture temperature below 20° C., Mixtures B, C and D were rapidly and successively added to the reactor. Within 10 minutes, the temperature rose as the polymerization started and peaked around 70° C. Ten minutes after the peak temperature, mixture E, followed by mixture F, were added. The material in the reactor was allowed to cool to 60° C. and Mixture G was added, followed by Mixtures H and I. After 5 minutes, mixtures J and K were separately metered into the reactor over 30 minutes while the batch was cooled. The neutralizer was then added to partially neutralize the polymerized acid and the polymer sample was then filtered through a 100 mesh screen to remove coagulum.

Sample B. Formation of a Precursor to First Solid Polymeric Particles

Preparation of crosslinked solid polymer particles of 0.045 μm in diameter for making first solid polymeric particles in aqueous dispersion.

TABLE B.1

Mixtures used in the formation of Sample B

| Mixture | Component | Parts by Weight |
|---|---|---|
| A | DI Water | 180 |
| | Sodium Carbonate | 0.40 |
| B | BA | 99.3 |
| | ALMA | 0.70 |
| | 1,4-Butanediol Diacrylate | 0.25 |
| | 22.5% aqueous Sodium Dodecylbenzenesulfonate | 2.22 |
| | DI Water | 40.8 |
| C | Sodium Persulfate | 0.06 |
| | Water | 11.9 |

A reactor equipped with stirrer and condenser and blanketed with nitrogen was charged with Mixture A and heated to 83° C. To the reactor contents was added 10% of emulsified Mixture B and 25% of Mixture C. The temperature was maintained at 83° C. and the mixture was stirred for 60 minutes, after which the remaining Mixture B and Mixture C were added to the reactor with stirring over a period of 120 minutes. Stirring was continued at 83° C. for 90 minutes, after which the reactor contents were cooled to room temperature. The particle size and solids content of the resulting emulsion were 0.054 μm and 32.52% respectively.

Sample C. Formation of a Precursor to First Polymeric Particles

The particles of Sample B were grown to 0.21 μm diameter.

TABLE C.1

Mixtures used in the formation of Sample C

| Mixture | Component | Parts by Weight |
|---|---|---|
| A | Sodium Carbonate | 0.08 |
| | 9.76% aqueous Sodium Dodecylbenzenesulfonate | 0.01 |
| | DI Water | 156.00 |
| B | 30.10% solids emulsion - Sample B | 29.80 |
| C | n-Butyl Acrylate | 81.80 |
| | Styrene | 18.20 |
| | 9.76% aqueous Sodium Dodecylbenzenesulfonate | 4.53 |
| | DI Water | 57.50 |
| D | 1-Hexanethiol/n-DDM | 18.80 |
| | 9.76% aqueous Sodium Dodecylbenzenesulfonate | 0.58 |
| | DI Water | 15.00 |
| E | Sodium Persulfate | 0.11 |
| | DI Water | 47.40 |
| F | t-Butyl Hydroperoxide 70% | 0.30 |
| | DI Water | 15.00 |
| G | Sodium Formaldehyde Sulfoxylate | 0.20 |
| | Water | 6.67 |

Mixture A was added to the reactor of Example 1 and heated to 88° C. with stirring. The air in the reactor was replaced by nitrogen. When the reactor temperature stabilized at 88° C., Mixture B was charged into the reactor. Emulsified Mixtures C and D, and Mixture E were then added to the reactor, with stirring, over a period of 300 minutes. Stirring was continued at 88° C. for 90 minutes. The reactor contents were cooled to 65° C. Mixtures F and G were added and the reactor contents were maintained at 65° C. with stirring for 1 hour, after which the reactor contents were cooled to room temperature. The resulting emulsion particles had an average diameter of 0.21 μm.

Sample D. Formation of First Solid Polymeric Particles

The particles of Sample C were expanded to create 0.84 μm average diameter first solid polymeric particles.

TABLE D.1

Mixtures used in the formation of Sample D

| Mixture | Component | Parts by Weight |
|---|---|---|
| | Stage I | |
| A3 | DI Water | 138.50 |
| B3 | Sample C at 29.88% solids | 0.105 |
| C3 | BA | 73.60 |
| | ALMA | 6.40 |
| | 10% aqueous Sodium Dodecylbenzenesulfonate | 0.28 |
| | DI Water | 33.12 |

TABLE D.1-continued

Mixtures used in the formation of Sample D

| Mixture | Component | Parts by Weight |
|---|---|---|
| D3 | t-Butyl Peroctoate | 0.427 |
| | 10% aqueous Sodium Dodecylbenzenesulfonate | 0.003 |
| | DI Water | 2.96 |

Stage II

| Mixture | Component | Parts by Weight |
|---|---|---|
| E3 | MMA | 19.20 |
| | EA | 0.80 |
| F3 | Sodium Formaldehyde Sulfoxylate | 0.062 |
| | DI Water | 6.67 |
| | 10% aqueous Sodium Dodecylbenzenesulfonate | 0.017 |
| G3 | t-Butyl Hydroperoxide 70% | 0.089 |
| | DI Water | 10.05 |
| | 10% aqueous Sodium Dodecylbenzenesulfonate | 0.037 |

To the reactor of Sample C was added A3 which was heated to 90° C. with stirring. The air in the reactor was replaced by nitrogen. When the reactor temperature stabilized at 90° C., Mixture B3 was charged into the reactor. Mixture C3 was emulsified with a homogenizer and charged into the reactor. The reactor was stirred at 60° C. for 1 hour. Mixture D3 was emulsified with a homogenizer and charged into the reactor. After 1 hour agitation at 60° C., the reactor was gradually heated to 65-70° C. while an exothermic polymerization took place. After reaching peak temperature, agitation was continued while the reactor was cooled to 73° C. in 30 minutes. Half of Mixture F3 was charged. Mixtures E3, the remainder of F3, and G3 were then separately added into the reactor over a period of 2 hours. The temperature was maintained between 73-75° C. and stirring was continued for 1 hour before the reactor was cooled to room temperature. The resulting first solid polymeric particles had a diameter of 0.84 μm.

Sample E. Formation of Solid Polymeric Particles Outside the Scope of First Solid Polymeric Particle Average Diameter.

Synthesis of an emulsion polymer of 5 μm average diameter having the 2 stage composition: 80(96BA/4ALMA)//20(96MMA/4EA); Calculated Tg of stage 1 (not including ALMA) is −54.0° C.; Calculated Tg of Stage 2 is 97.5° C.

Formation of Seed Polymer for Use in Preparing Particulate Polymer

Unless otherwise noted, the terms "charged" or "added" indicate addition of all the mixture at once. The following mixtures were prepared:

TABLE E.1

Reaction mixtures used in formation of seed polymer of Sample E

| Mixture | Component | Parts, By Weight |
|---|---|---|
| A | DI Water | 208 |
| | Sodium Carbonate | 0.38 |
| B | BA | 98 |
| | Butylene Glycol Diacrylate | 0.25 |
| | ALMA | 2.0 |
| | 10% aqueous Sodium Dodecylbenzenesulfonate | 4.0 |
| | DI Water | 40 |
| C | Potassium Persulfate | 0.063 |
| | DI Water | 35 |

A reactor equipped with stirrer and condenser and blanketed with nitrogen was charged with Mixture A and heated to 82° C. To the reactor contents was added 15% of Mixture B and 25% of Mixture C. The temperature was maintained at 82° C. and the reaction mixture was stirred for 1 hour, after which the remaining Mixture B and Mixture C were metered in to the reactor, with stirring, over a period of 90 minutes. Stirring was continued at 82° C. for 2 hours, after which the reactor contents were cooled to room temperature. The average diameter of the resulting emulsion particles was 0.2 micron.

TABLE E.2

Mixtures used in formation of second step of Sample E

| Mixture | Component | Parts by Weight |
|---|---|---|
| A2 | Sodium Carbonate | 0.08 |
| | 50% Methoxy-beta-cyclodextrin | 2.0 |
| | DI Water | 153.3 |
| B2 | Seed polymer (above) | 8.41 |
| C2 | BA | 82.0 |
| | MMA | 17.8 |
| | MAA | 0.20 |
| | 9.76% aqueous Sodium Dodecylbenzenesulfonate | 4.18 |
| | DI Water | 22.21 |
| D2 | n-Dodecyl Mercaptan | 22.00 |
| | 9.76% aqueous Sodium Dodecylbenzenesulfonate | 2.04 |
| | DI Water | 21.65 |
| E2 | Sodium Persulfate | 0.20 |
| | DI Water | 10.0 |
| F2 | t-Butyl Hydroperoxide 70% | 0.30 |
| | DI Water | 15.00 |
| G2 | Sodium Formaldehyde Sulfoxylate | 0.20 |
| | DI Water | 6.67 |

Mixture A2 was added to the reactor and heated to 88° C. with stirring. The air in the reactor was replaced by nitrogen. When the reactor temperature stabilized at 88° C., Mixture B2 was charged into the reactor. Emulsified Mixtures C2 and D2, and Mixture E2 were then added to the reactor, with stirring, over a period of 240 minutes. Stirring was continued at 88° C. for 90 minutes. The reactor contents were cooled to 65° C. Mixtures F2 and G2 were added and the reactor contents were maintained at 65° C. with stirring for 1 hour, after which the reactor contents were cooled to room temperature. The resulting emulsion particles had a diameter of 0.75 microns as measured by a Brookhaven Instruments particle size analyzer BI-90.

TABLE E.3

Reactants used in formation of solid polymeric particles outside the scope of first solid polymeric particles.

| Mixture | Component | Parts by Weight |
|---|---|---|
| Stage I | | |
| A4 | DI Water | 1400.0 |
| B4 | Aqueous emulsion from second step (above) | 9.70 |
| C4 | BA | 768.0 |
| | ALMA | 32.0 |
| | 23% aqueous Sodium Dodecylbenzenesulfonate | 12.60 |
| | DI Water | 324.4 |
| D4 | t-Butyl Peroctoate | 3.82 |
| | 23% aqueous Sodium Dodecylbenzenesulfonate | 0.16 |
| | DI Water | 8.40 |

TABLE E.3-continued

Reactants used in formation of solid polymeric particles outside the scope of first solid polymeric particles.

| Mixture | Component | Parts by Weight |
|---|---|---|
| | Stage II | |
| E4 | MMA | 191.7 |
| | EA | 8.30 |
| | 23% aqueous Sodium Dodecylbenzenesulfonate | 2.43 |
| | DI Water | 50.2 |
| F4 | 2% Sodium Formaldehyde Sulfoxylate in water | 40.0 |
| G4 | 4.4% t-Butyl Hydroperoxide (70%) in water | 24.90 |

To a reactor A4 was added and was heated to 76° C. with stirring. The air in the reactor was replaced by nitrogen. When the reactor temperature stabilized at 76° C., Mixture B4 was charged into the reactor. 20% of Mixture C4 was charged into the reactor. The reactor was stirred at 60-65° C. for 0.5 hours. Mixture D4 was charged into the reactor. After 23 minutes agitation at 60-65° C. an exothermic polymerization took place. After reaching peak temperature, agitation was continued while the remaining 80% of mixture C4 was added over 48 minutes. 27.5% of Mixture F4 was charged. Mixtures E4, the remainder of F4, and G4 were then separately added into the reactor over a period of 45 minutes. The temperature was maintained between 75-80° C. and stirring was continued for 1 hour before the reactor was cooled to room temperature. To the resultant dispersion of polymeric particles 1.5% of ACRYSOL™ ASE-60 was added based on the total weight of the emulsion and the pH was increased by sequential additions of triethylamine to a pH of 7-9.

COMPARATIVE EXAMPLE A

Formation of Aqueous Coating Composition

The mixing of ingredients was carried out in a plastic container using an overhead stirrer under slow stirring. First 1.63 g ACRYSOL™ ASE 60 and a potion of ammonia-28% (total 0.27 g) were mixed for 1 min. 11.35 g of Sample D (29.72% solids) was added to the above mixer under continuous stirring; then Sample A (86.75 g) and the rest of the ammonia-28% were added and stirred for additional 2-3 min. The final mixture was a clear aqueous coating composition.

ACRYSOL™ is a trademark of The Dow Chemical Company.

EXAMPLES 1-2

Formation of Aqueous Coating Compositions

The procedure of making Examples 1-2 was the same as described in Comparative Example A except that the relative amounts of Samples A and C were varied.

EXAMPLE 3

The mixing of ingredients was carried out in a plastic container using an overhead stirrer. First, 1.87 g DI water and 0.47 g 1124 were mixed for 1 min. Next, 34.06 g of TI-PURE™ R-746 was added slowly over a period of 2 min. Dispersion was continued for additional 5 min. Sample D (28.29 g), RHOPLEX™ VSR-50 (25.22 g), BYK™-028 (0.04 g), TEXANOL™ (0.57 g), and 0.07 g ammonia-28% were added to the above mixer under continuous stirring. Stirring speed was increased and 0.86 g ACRYSOL™ RM-2020 was added slowly. An increase in viscosity was observed during ACRYSOL™ RM-2020 addition. Next, 1.27 g ACRYSOL™ RM-8W was added under high speed stirring. Finally, 7.28 g DI water was added to adjust the viscosity. The final mixture was a pigmented aqueous coating composition.

TAMOL™ and RHOPLEX™ are trademarks of The Dow Chemical Company; TI-PURE™ is a trademark of E.I. DUPONT DE NEMOURS COMPANY; BYK™ is a trademark of ALTANA AG; TEXANOL™ is a trademark of Eastman Chemical Company.

EXAMPLES 4-7 AND COMPARATIVE EXAMPLE B

The procedure of making Examples 4-7 and Comparative EXAMPLE B was same as described in Example 3 except for varying the amounts of ingredients as indicated in the tables below.

COMPARATIVE EXAMPLE C

In a stainless steel container, 7.31 g of water, 0.17 g TAMOL™1124, 0.01 g of BYK™-028, and 0.02 g of TRITON™ CF-10 were mixed for 1-2 min using a Cowles disperser. Next, under high speed stirring (1000 rpm) using the Cowles disperser, 6.98 g of OMYACARB™ 5 was added slowly for a period of 5 min. Dispersion was continued for additional 10-15 min at 1500 rpm. Uniform dispersion of OMYACARB™ 5 was confirmed using a Hegman gauge. After grinding, let-down and final mixing were carried out following the procedure described in Example 3.

OMYACARB™ is a trademark of OMYA AG.

COMPARATIVE EXAMPLES D-E

The procedure of making Comparative Examples D-E was same as described in Comparative Example C except for varying the amounts of OMYACARB™ 5 as indicated in Table 10-3 below.

EXAMPLE 8

Evaluation of Clear Coatings

The aqueous coating compositions were applied using a 1.5 mil Bird applicator over a Leneta Form 3B opacity chart. The specular gloss was measured using a handheld gloss meter over the black portion of the opacity chart.

TABLE 8.1

Clear coat aqueous coating compositions containing various ratios of first solid polymeric particles (Sample D) to second solid polymeric particles (Sample A) and evaluation of coatings. All weights are in g.

| | Formulations | | |
|---|---|---|---|
| Ingredients | Ratio = 10:90 (wt.:wt.) Comparative A | Ratio = 30:70 (wt.:wt.) Example 1 | Ratio = 40:60 (wt.:wt.) Example 2 |
| Sample D (29.72% solids) | 11.35 | 32.94 | 43.18 |

TABLE 8.1-continued

Clear coat aqueous coating compositions containing various ratios of first solid polymeric particles (Sample D) to second solid polymeric particles (Sample A) and evaluation of coatings. All weights are in g.

| | Formulations | | |
|---|---|---|---|
| Ingredients | Ratio = 10:90 (wt.:wt.) Comparative A | Ratio = 30:70 (wt.:wt.) Example 1 | Ratio = 40:60 (wt.:wt.) Example 2 |
| Sample A | 86.75 | 65.25 | 55.01 |
| Ammonia-28 % | 0.27 | 0.24 | 0.26 |
| RHOPLEX ™ ASE-60 | 1.63 | 1.57 | 1.55 |
| Total | 100.00 | 100.00 | 100.00 |
| Gloss measurement | | | |
| 20° | 28.4 | 2.4 | 0.3 |
| 60° | 66.7 | 24.4 | 11.0 |
| 85° | 92.8 | 84.0 | 78.4 |

Coatings formed from the aqueous coating compositions of Examples 1-2 of the present invention exhibit the desired gloss profile relative to that of Comparative Example A.

EXAMPLE 9

Evaluation of Pigmented Coatings

TABLE 9.1

Pigmented aqueous coating compositions containing a 40:60 (wt.:wt.) ratio of first solid polymeric particles (Sample D) to second solid polymeric particles (Sample A) vs a larger particle diameter Particle (Sample E in place of Sample D at the same ratio and evaluation of coatings. All weights are in g.

| | Formulations | |
|---|---|---|
| Ingredients | Sample D:Sample A = 40:60 (wt.:wt.) Example 3 | Sample E:Sample A = 40:60 (wt.:wt.) Comparative Example B |
| Aqueous coating composition | | |
| TI-PURE ™ R-746 | 34.06 | 34.06 |
| TAMOL ™ 1124 | 0.47 | 0.47 |
| Water | 1.87 | 1.87 |
| Sample D | 28.29 | 0.00 |
| Sample E (33.00% solids) | 0.00 | 25.48 |
| Water | 7.28 | 10.09 |
| RHOPLEX ™ VSR-50 | 25.22 | 25.22 |
| BYK-028 | 0.04 | 0.04 |
| TEXANOL ™ | 0.57 | 0.57 |
| ACRYSOL ™ RM-2020 | 0.86 | 0.86 |
| Ammonia-28% | 0.07 | 0.07 |
| ACRYSOL ™ RM-8W | 1.27 | 1.27 |
| Total | 100.00 | 100.00 |
| Specular Gloss | | |
| 20° | 1.4 | 1.4 |
| 60° | 10.7 | 4.1 |
| 85° | 79.5 | 21.2 |

Coatings formed from the aqueous coating compositions of Example 3 of the present invention exhibits the desired gloss profile relative to that of Comparative Example B.

EXAMPLE 10

Evaluation of Pigmented Coatings

In this example the effect of first polymer particles is contrasted with that of inorganic ($CaCO_3$)extenders.

TABLE 10.1

Pigmented aqueous coating composition of Example 4 containing first solid polymeric particles (Sample D) (20 PVC) and $TiO_2$ (20 PVC).

| Ingredients | Weight (g) |
|---|---|
| RHOPLEX ™ VSR-50 | 40.32 |
| TAMOL ™ 1124 | 0.36 |
| TI-PURE ™ R-746 | 28.00 |
| Small Bead-0.85 μm (29.72% solid) | 19.83 |
| BYK ™-028 | 0.04 |
| TEXANOL ™ | 0.92 |
| TRITON ™ CF-10 | 0.05 |
| ACRYSOL ™ RM-2020 | 0.90 |
| ACRYSOL ™ RM-8W | 0.97 |
| Ammonia-28% | 0.10 |
| Water | 8.52 |
| Totals | 100.00 |

TABLE 10.2

Pigmented aqueous coating composition of Comparative Example C containing no first solid polymeric particles, $CaCO_3$ inorganic extender (10 PVC), and $TiO_2$ (20 PVC).

| Ingredients | Stages | Weight (g) |
|---|---|---|
| Water | Grind | 7.31 |
| TAMOL ™ 1124 | | 0.17 |
| BYK ™-028 | | 0.01 |
| TRITON ™ CF-10 | | 0.02 |
| OMYACARB ™ UF (0.8 um calcium carbonate) | | 6.98 |
| TI-PURE ™ R-746 | Let down | 26.82 |
| Water | | 10.95 |
| RHOPLEX ™ VSR-50 | | 45.01 |
| BYK-028 | | 0.02 |
| TEXANOL | | 1.02 |
| ACRYSOL ™ RM-2020 | | 0.86 |
| Ammonia-28% | | 0.12 |
| ACRYSOL ™ RM-8W | | 0.70 |
| Totals | | 100.00 |

TABLE 10.3

Specular gloss results for coatings formed from
Examples 4-7 and Comparative Examples E-G.

| | Coatings Formed from: | | | | | | |
|---|---|---|---|---|---|---|---|
| | Ex. 4 | Ex. 5 | Ex. 6 | Ex. 7 | Comp. Ex. C | Comp. Ex. D | Comp. Ex. E |
| TiO$_2$ PVC | 20 | 20 | 20 | 20 | 20 | 20 | 20 |
| Sample D PVC | 20 | 30 | 40 | 50 | | | |
| OMYACARB ™ UF PVC | | | | | 10 | 20 | 30 |
| Specular Gloss | | | | | | | |
| 20° | 2.5 | 1.7 | 1.4 | 1.4 | 2.8 | 1.4 | 1.3 |
| 60° | 26.7 | 17.2 | 13.1 | 14.8 | 24.2 | 5.3 | 3.1 |
| 85° | 84.4 | 81.9 | 78.4 | 82 | 72.3 | 45.4 | 28.1 |

Coatings formed from the aqueous coating compositions of Examples 4-7 of the present invention exhibit the desired gloss profile relative to those of Comparative Examples C-E in which first polymer particles have been replaced with an inorganic extender.

What is claimed is:

1. An aqueous coating composition comprising:
   first solid polymeric particles selected from the group consisting of multi-stage graded refractive index (grin) composition copolymer particles having an average diameter of 0.60-0.99 μm, multi-stage copolymer particles having an average diameter of 0.60-0.99 μm and a rubbery core having a calculated glass transition temperature (T$_g$) of 20° C. or less, and mixtures thereof; and
   second solid polymeric particles having a calculated T$_g$ of from −60° C. to 120° C. and an average particle diameter of from 50 nm to 500 nm;
   wherein the dry weight ratio of the first solid polymeric particles to the second solid polymeric particles is from 0.15:1 to 10:1 and the aqueous coating composition comprises less than 10% by volume of inorganic extender particles.

2. The aqueous coating composition of claim 1, wherein the first solid polymeric particles are selected from the group consisting of acrylic multi-stage copolymer particles, vinyl multi-stage copolymer particles, multi-stage synthetic rubber copolymer particles, multi-stage urethane copolymer particles, water-dispersible graft copolymer particles, mixtures thereof, combinations thereof, and mixtures thereof with a single stage crosslinked (co)polymer.

3. The aqueous coating composition of claim 1, wherein the first solid polymeric particles and the second solid polymeric particles are acrylic polymers.

4. The aqueous coating composition of claim 3, wherein the second solid polymeric particles are two-stage acrylic emulsion copolymer particles.

5. The aqueous coating composition of claim 1, further comprising pigment particles.

6. A method for providing a coating comprising:
   (a) forming the aqueous coating composition of claim 1;
   (b) applying the coating composition to a substrate; and
   (c) drying, or allowing to dry, the coating composition.

7. A coating formed by the method of claim 6, wherein the ratio of the 85° specular gloss to the 20° specular gloss is equal to or greater than 33.

8. The coating of claim 7, further comprising pigment particles.

9. The coating of claim wherein the coating is below its critical pigment volume concentration.

* * * * *